United States Patent

Hirs

[15] 3,669,882
[45] June 13, 1972

[54] METHOD OF AND APPARATUS FOR FILTERING

[72] Inventor: Gene Hirs, Birmingham, Mich.

[73] Assignee: Hydromation Engineering Company, Livonia, Mich.

[22] Filed: Oct. 6, 1969

[21] Appl. No.: 863,920

[52] U.S. Cl. .................................. 210/33, 210/41, 210/75, 210/80, 210/189, 210/279, 210/502
[51] Int. Cl. .................................. B01d 23/10, B01d 39/06
[58] Field of Search .................. 210/33, 80, 189, 279, 283, 210/502, 504, 41, 24, 75; 252/463

[56] References Cited

UNITED STATES PATENTS

| | | | |
|---|---|---|---|
| 2,134,114 | 10/1936 | Eliott | 210/33 X |
| 2,199,258 | 4/1940 | Gray | 210/283 |
| 2,789,695 | 4/1957 | Winkler et al. | 210/80 |
| 3,238,125 | 3/1966 | Mihara et al. | 210/189 X |
| 3,382,983 | 5/1968 | Stewart | 210/502 X |
| 3,104,944 | 9/1963 | Hayes | 252/463 X |
| 2,758,070 | 8/1956 | Yurko | 210/41 X |

Primary Examiner—Reuber Friedman
Assistant Examiner—Thomas G. Wyse
Attorney—Cullen, Settle, Sloman & Cantor

[57] ABSTRACT

This invention proposes the use of granular, finely divided alumina ($Al_2O_3$) as an insoluble, chemically inert, high temperature filtration medium in systems requiring ultra-fine filtration, such as in steam turbine power plants, chemical processing, pharmaceutical manufacturing, and the like.

A method and apparatus for utilizing this heavy and difficultly handled material is also proposed. The method and apparatus are characterized by high filtration rates, extreme clarity of effluent, rejuvenation of the medium, and the prevention of medium-contamination of the effluent.

6 Claims, 3 Drawing Figures

INVENTOR.
GENE HIRS.
BY
CULLEN, SETTLE, SLOMAN & CANTOR.
ATT'YS.

INVENTOR.
GENE HIRS.
BY
CULLEN, SETTLE, SLOMAN & CANTOR.
ATT'YS.

METHOD OF AND APPARATUS FOR FILTERING

BACKGROUND OF THE INVENTION

There are many places in industry where almost absolute clarity is required in a particular liquid, and the clarity is defined in terms of parts of contaminant per billion parts of liquid. Such clarity demands occur in power plants, in the manufacture of pharmaceuticals, in the manufacture of chemicals, and in the manufacture of various yarns.

Considering, for example, the demands of power plants, where power is generated by transforming the heat energy of steam into mechanical energy in a turbine, it is mandatory that the steam and the condensate be as clean as possible. The presence of any entrained suspended particles in the condensate and in the steam causes these particles to blast and impinge against the turbine blades, causing considerable damage and wear on the blades and other moving parts of the turbine, in the piping, valving, etc. In order to have the maximum life for the equipment in turbine-power plants, it is an accepted practice of filtering the condensate or the hot water to the greatest degree of clarity possible before heating the condensate to steam. The requisite degree of clarity can be understood by comparing it with the clarity of normal drinking water. Drinking water as it comes out of the taps, i.e., after it has picked up suspended matter in the piping system, should have a clarity in the range of 1 to 2 parts per million. In the generation of power, a clarity of 5 parts per billion is required, or a degree of clarity which is 200 to 400 times greater than that of acceptable drinking water.

Of course, it is an extremely difficult job to achieve this degree of clarity. The most accepted method is to precoat cartridges or filter tubes with a cellulose, fibrous material to initially close off the septum of a stainless steel perforate element. Then, a second layer of material is precoated on top of the cellulose material and, most likely, this resinous second layer is of fineness to pass through a 200 mesh sleeve. In fact, a considerable quantity of the resinous material would pass through a 325 mesh sleeve. These granular resinous particles are generally spherical in shape and cannot be retained without the primary coat of fibrous or cellulose type material. On the passage of the steam condensate through the resinous material precoated on two of the cellulosic materials, the dirt content or suspended matter in the steam condensate can be reduced from about 100 parts per billion to 10 parts per billion. Once the resinous material becomes clogged due to the accretion of particles thereon, all of the cellulosic material and the resinous material are abandoned to waste.

This system has several drawbacks, and is tolerated only because it is the only present practical scheme for attaining the requisite degree of clarity. First, the resinous and cellulosic materials now in use cannot tolerate temperatures in excess 150° F. Since the condensate, after passage through the turbines, is at a temperature of 500°, the condensate must be reduced to a temperature of 150° by heat exchange. The tremendous amount of heat which is wasted will be readily appreciated. Further, the waste water from the heat exchangers is returned to the stream from whence it was drawn, causing heat pollution in the streams. Finally, after the condensate is passed through the filter media, it is again reheated before it goes into the boiler, taking on additional heat. The necessity of reducing the temperature of the condensate just to render the condensate filterable requires costly, expensive equipment and results in enormous waste of heat, and produces pollution. Further, the resinous materials which are used as a final filtering means by precoating onto these cellulosic coated septum elements are extremely expensive and require disposal after it has been once utilized. The problem of disposal of the resinous material is particularly aggravating in an atomic energy power plant, since all such wastes are radioactive and must be disposed of in very laborious stages.

All in all, it will be readily appreciated that a considerable savings in operating cost could be realized if the steam condensate could be filtered at a temperature of 500° to 600° F. or at any other elevated temperature above the 150° temperature now required for filtration.

In essence, the primary problem in the filtration to ultra fineness, (as above explained in connection with the filtration of steam condensate, but also involved in filtration in the fields of pharmaceuticals, chemicals and foods and the like), resides in the fact that all materials are somewhat soluble in water or other common solvents. Further, an acceptable material must be inert to substantially all common chemicals and capable of withstanding elevated temperatures. Additionally, the material has to possess certain filtration characteristics, such as the ability to precoat the material on a filter tube, the ability of the material to bridge the filter tube openings during precoating, and the ability of the material to filter well.

BRIEF DESCRIPTION OF THE PRESENT INVENTION

After considerable study and experimentation during which literally dozens of materials were evaluated for solubility, chemical resistance, temperature stability, precoating capability, and filtration ability, applicant has found that aluminum oxide ($Al_2O_3$) is a practical filter medium for utilization under conditions such as those above described. Unfortunately, alumina or aluminum oxide is a fairly heavy material and is extremely abrasive. Consequently, special handling apparatus and methods were developed and are herein disclosed which make practical the utilization of alumina as a filter medium. The specific characteristics of the filtration apparatus and the specific manipulative techniques utilized in the formation of an acceptable aluminum oxide media, in rejuvenating the media for reuse, and in reconstituting the filter medium are specifically hereafter disclosed. It will be appreciated that the apparatus characteristics and method techniques hereinafter disclosed and claimed are specifically adapted to the handling of aluminum oxide or the like heavy materials.

It is, therefore, an object of the present invention to provide a filter medium consisting essentially of granular alumina.

Another important object of the present invention is the provision of a method of filtering wherein a liquid containing solid contaminants is passed through a filter media consisting essentially of granular alumina and having a thickness, measured in the direction of liquid flow, of at least one inch.

It is yet a further object of this invention to provide an apparatus for filtration having spaced inlet and outlet openings and a bed of filter media interposed between said openings, the bed consisting essentially of granular, finely divided aluminum oxide.

Still another, and no less important object of the present invention is the provision of a deep bed filter incorporating therein a body of alumina as a filter medium interposed between inlet and outlet openings, means for removing the alumina from the bed location, means for rejuvenating the alumina by the removal of contaminant particles dispersed therein, and means for returning the alumina to the location of the bed.

Other objects and features of the invention will become apparent by reference to the following specification and the drawings.

ON THE DRAWINGS

AS SHOWN ON THE DRAWINGS

Figure 1:
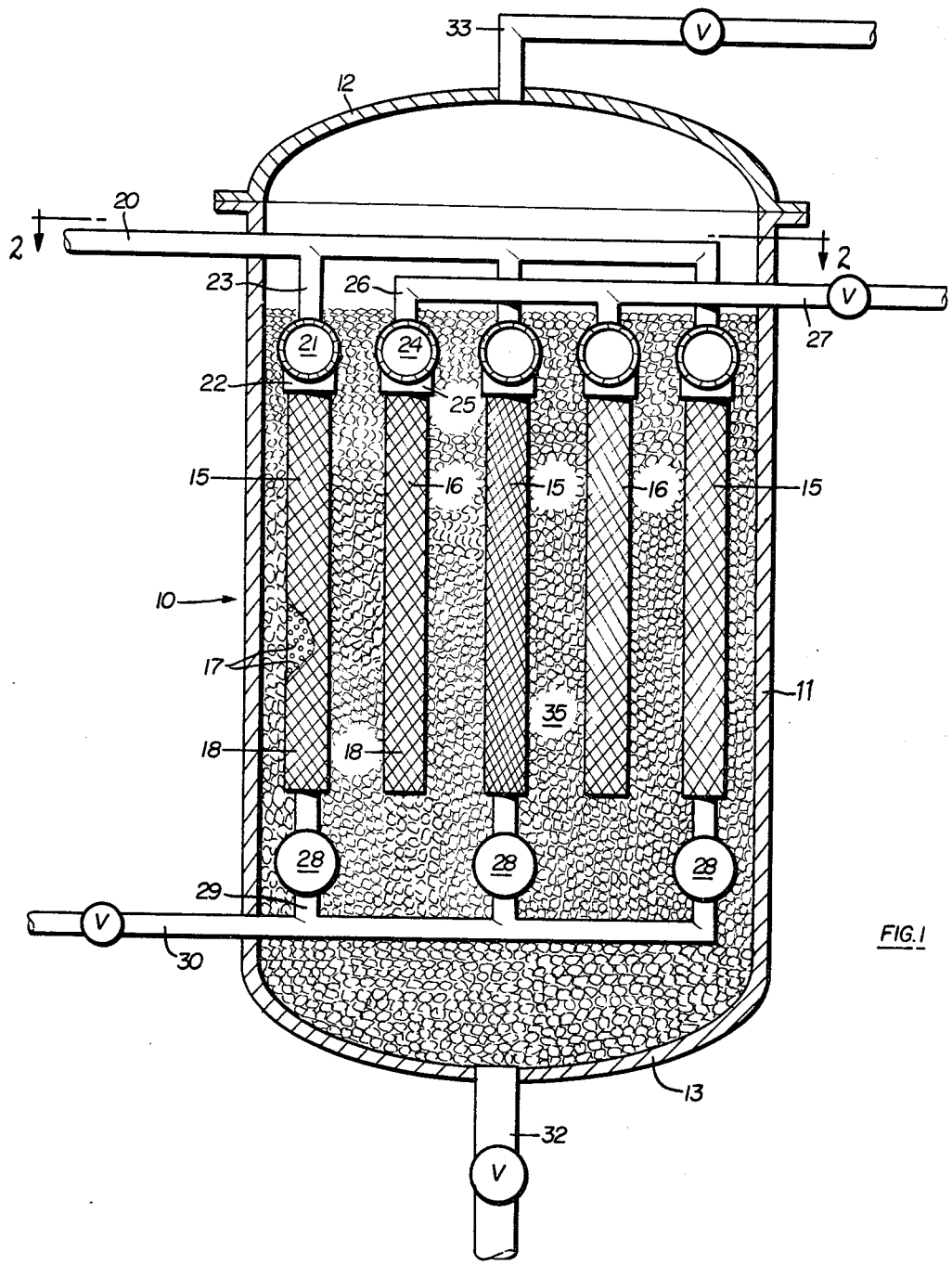
FIG. 1 is a vertical sectional view, with parts shown in elevation, illustrating the deep bed filter forming a portion of the filtration apparatus of the present invention.

In FIG. 1, reference numeral 10 refers generally to a tank or pressure vessel of welded steel construction including a cylindrical side wall 11, an upper spherical end cap 12 and a lower hemispherical end cap 13.

Disposed within the tank to depend vertically thereof are a plurality of outlet tubes 15 and inlet tubes 16 radially spaced from one another. These tubes 15 and 16 are substantially identical in structure and, in a preferred embodiment, are formed standard pipe sections of stainless steel or other similar material provided with a plurality of radial perforations 17, these perforations preferably being on the order of less than about 0.003 inch in diameter.

Enveloping each of the tubes 15, 16 is a stainless steel mesh wire or cloth 18 forming a tight mesh upon which the filter medium will precoat or accrete in a manner to be hereafter more fully described.

The outlet tubes 15 communicate with an upper, horizontal, manifold outlet pipe 20 protecting radially through the upper cap 12 and generally overlying the tubes 15 to be connected thereto through arcuate manifolds 21. Suitable adapters 22 and connecting piping 23 join the tubes 15 to the manifolds 21 and the outlet line 20. Similarly manifolds 24, adapters 25 and connecting piping 26 interconnect the inlet tubes 16 with outlet line 27 projecting through the cap 12. The bottom ends of the outlet pipes 15 only are similarly connected through manifold 28 in appropriate piping 29 with a return pipe or line 30 projecting through the lower cap 13. A drain line 32 is provided at the medial, lowermost portion of the bottom cap 13 and a fill line 33 communicates with the apex of the upper cap 12.

Figure 2:
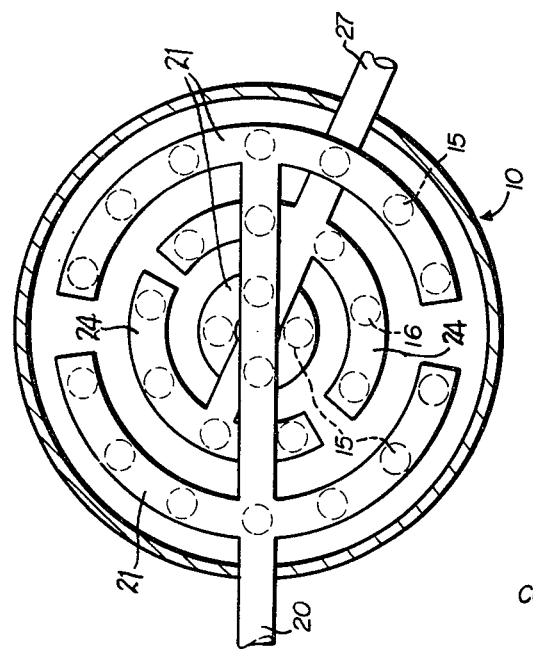
FIG. 2 is a sectional view taken along planes 2—2 of FIG. 1.

As best shown in FIG. 2, a plurality of pipes 15 and 16 are provided, the pipes being retained in peripheral, radially and circumferentially spaced array so that the minimum distance between any inlet pipe 16 and any outlet pipe 15 is not less than 1 inch, and preferably from 3 to 6 inches.

Also as shown in FIG. 1 of the drawings, the tank or casing 10 is filled with a body of particulate filter medium indicated generally at 35, the preferred filter medium of the present invention comprising alumina or aluminum oxide ($Al_2O_3$). As a specific example, the alumina which is specifically preferred is calcined and typically has one of the following chemical analyses:

|  | Sample I | Sample II |
|---|---|---|
| $Na_2O$ | 0.60 | 0.50 |
| $SiO_2$ | 0.02 | 0.02 |
| $Fe_2O_3$ | 0.02 | 0.02 |
| $TiO_2$ | 0.002 | 0.002 |
| Loss on Ignition | 0.60 | 0.20 |
| $Al_2O_3$ (By Difference) | 98.70 | 99.20 |
| Sorbable water at 50% R.H. | 0.40 | 0.20 |

Thus it will be seen that the calcined aluminum which is preferred is of a high degree of purity (on the order of 99 percent $Al_2O_3$).

The calcined aluminum which is preferred is also finely divided and has the following typical screen analysis:

SCREEN ANALYSES, %

(Tyler Standard Screen)

|  | On 100 Mesh | On 200 Mesh | On 325 Mesh | Thru 325 Mesh |
|---|---|---|---|---|
| Sample I | 5–15 | 70–90 | 97–99 | 1–3 |
| Sample II | 5–15 | 70–90 | 97–99 | 1–3 |

Calcined aluminas of the above-defined typical chemical analysis and typical screen analysis or the equivalent are commercially available from various sources, including Kaiser Chemical Corp. and Reynolds Metals Corporation.

By reference to a U.S. sieve chart under the standard ASTM E–11–61, it will readily be determined that the alumina of the preferred embodiment is of a predominate or average particle size of less than 149 microns and greater than 44 microns.

Figure 3:
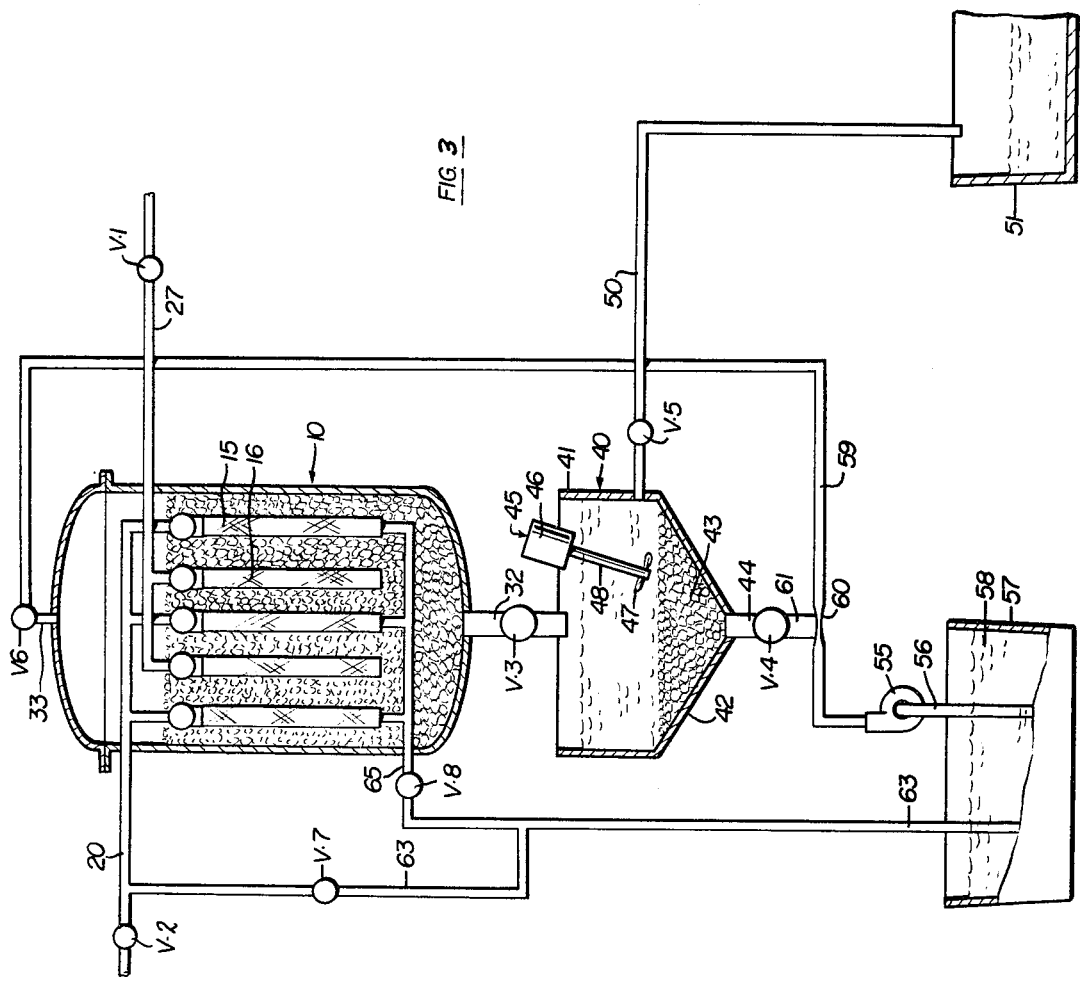
FIG. 3 is a schematic representation of an overall filtration apparatus of the present invention utilizing the deep bed of FIG. 1.

Turning now to the filtration system illustrated in FIG. 3 of the drawings, it will be noted that the tank 10 is filled with granular, finely divided alumina, as above-defined, to a level above the level of the manifolds 21, 24 so that the tubes 15, 16 are completely embedded in the filter material and are separated from one another through a depth of alumina of at least 1 inch. The manner of filling the container and of precoating the alumina onto the tubes will be hereinafter discussed in connection with the rejuvenation of the media.

The line 27 is provided with an off-on valve V1 through which the line 27 is connected to a source of dirty liquid, e.g., a source of condensate liquid in a stream generation plant. This dirty liquid will flow through the line 27 and the connecting lines 16 into the manifold 24 and the connectors 25 into the individual, radially spaced inlet tubes 16. The liquid will flow along the length of the inlet tubes 16 and will escape through the perforations 17 therein for flow through the granular filter medium 35 into the outlet tubes 15. The liquid exits from the tubes 15 by flowing upwardly through the outlet tubes 15, the connectors 24, the manifolds 21 and the connecting piping 23 for exit through the outlet line 20 in which an off-on valve V2 is interposed. This is the normal operating flow of liquid through the filter apparatus 10, and any solid contaminants in the incoming dirty liquid in the pipe 27 will be entrapped within the interslices of the finely divided filter medium 35 during such flow.

It has been found through actual experimentation that, with a filter influent or dirty liquid having a dirt content of 10 parts per million, the effluent or clean liquid flow from the filter consistently contains less than 5 parts per billion. When the influent was on the order of 100 parts per billion, the effluent was consistently below 3 parts per billion. These results confirm the filtration properties of aluminum oxide and well meet the operating requirements for power plant condensate filtration and the like.

Normal flow of influent into the filter medium and effluent from the filter medium will continue until such time as sufficient foreign material has accreted in the body 35 of filter medium to substantially inhibit the flow of liquid therethrough or until such time as the effluent in the line 20 is of an intolerable degree of turbidity. Either the increase in resistance to the flow of liquid through the filter medium or such increased turbidity may be used to determine the necessity for rejuvenation of the filter medium. In the event that it is desired to rejuvenate the filter medium in the event of a rise of pressure drop across the medium, a simple pressure gauge may be installed in the inlet line 27, which gauge would sound an alarm, give a visual indication or even automatically initiate the filter rejuvenation cycle. Alternatively, a continuous turbidity monitoring system may be installed in the clean outlet or effluent line 20, such a monitoring system would again give audible or visual alarm or initiate automatically the filter rejuvenation cycle.

To rejuvenate the filter medium, the first step required is to close the valves V1 and V2, shutting off the flow of liquid through the tank 10. Next, the valve V3 interposed in the drain line 32 is opened and the filter medium drains through the drain line 32 into a lower medium-dirt separation tank 40. This tank 40 comprises generally an open topped, cylindrical upper section 41 and a lower drainage section having sloping or conical side walls 42 defining a lower settling area 43 provided with a drain line 44 controlled by a valve V4. The drainage of the filter medium through the line 32 into the tank is accomplished with the valve V4 closed. A mixer indicated generally at 45 is provided to stir the contents of the tank 40, this mixer having a drive motor 46 and a lower agitator or propeller 47 at the lower extremity of an actuating shaft 48.

Upon actuation of the mixer, the propeller 47 will stir up the mixture of media, liquid and admixed dirt or contaminants within the separation tank 40. The alumina is far more dense than the finely divided particulate or dirt contaminants admixed with the water and a gravity separation of the alumina filter medium to the bottom region 43 of the tank very quickly occurs. A decanting line 50 leads from the upper portion of the tank 40 to a waste tank 51 and a valve V5 is interposed in the line 50 to accommodate opening of the line 50 and decanting of the liquid and admixed dirt through the line 50.

Next, a refill pump 55 is started, this pump having its inlet line 56 immersed within a body of clean water 58 contained within a clean water tank 57 and has its outlet line 59 connected through a valve V6 with the refill line 55 heretofore described and communicating with the extreme free end of the tank 10 through the cap 12. A venturi-type eductor, schematically illustrated at 60, is interposed in the outlet line 59 of pump 55 and this eductor 60 has its throat connected, as by line 61, to the valve V4 controlling the flow of medium through the drain line 44 to the tank 40.

Upon opening of the valve V4, the flow of clean water through the pump outlet line 49 will educt or aspirate the media from the tank 40 through the line 44, the open valve V4 and the line 61 into the line 59 for travel to the tank 10 when the valve V6 is open. At the same time the valve V7 is positioned in a bypass line 63 is opened to provide a return path through which liquid flows through the interior of the outlet tubes 15 back to the clean water tank 58.

In this manner, the media 35, which settled to the bottom of the medium and dirt separation tank 40, is pumped by flow from the pump 55 through the line 59 into the interior of the tank 10. The liquid is vented from the tank through the outlet tubes back to the clean water tank 57, and the media accretes or accumulates on the exterior surfaces of the outlet tubes 15. More specifically, the media 35 is pre-coated upon the cloth covering 18 of the outlet tubes 15.

Inasmuch as this is a conventional precoating-type operation, some of the media may well travel through the cloth covering 18 on the outlet tubes 15 and into the tubes 15 for flow back through the lines 20 and 63 to the clean water tank 57. In the event that this happens, the much denser medium soon settles to the bottom of the tank and does not interfere with the intake of clean water through the pump intake 56. More likely, the flow of liquid upwardly through the outlet tubes 15 will be at a velocity which is insufficient to flush upwardly any media entering the tubes 15 and the medium particles will either remain suspended in the liquid flowing upwardly through the tubes 15 or will settle to the bottom of the tubes 15.

The cycling of liquid from the tank 57 through the line 59 and into the tank 15 and thence through the lines 20 and 63 back to the tank 58 continues for a period of time sufficient (1) to refill the tank 10 with all of the medium which is collected in the lower portion 43 of the separating tank 40, (2) until the level of the medium is substantially as shown in FIG. 1 and (3) until the outlet tubes 15 are completely precoated. At this time valve V7 is closed and valve V8 interposed in drain line 65 is opened. This line 65 interconnects the lower manifolds 28 communicating with the lower open ends of the outlet tubes 15 with the drain line 63 to the clean water tank 58, and any media within the tubes 15 will be flushed therefrom by the flow of liquid into the tank 10 from the pump 55, through the line 59 and valve V6. Once again, this media will readily gravitationally separate within the tank 58 for subsequent reuse, if desired. After sufficient time has elapsed for substantially all of any such particles to have escaped to the clean water tank 58 from the bottom of the outlet tube 15, the valve V8 is closed. The valve V2 is opened, the valve V4 is closed, the pump 55 is shut off and the valve V6 is closed, while the valve V1 is opened. The filtration apparatus 10 is now back on its filtering cycle with dirty liquid entering the tank 10 through the line 12 and clean liquid exiting from the tank 10 through the line 20.

While the precoating of the outlet tubes 15 have been described in connection with the complete rejuvenation cycle, it will be appreciated that substantially this same precoating operation will be carried out following initial filling of the tank with media to initiate filtration operation. In other words, the upper cap 12 is initially removed, the granular, finely divided body of filter media 25 is placed within the tank to completely cover the tubes and the manifolds 21, 24, valve V2 and V7 are opened, the pump 55 is started and the valve V6 is opened. Thus, the initial precoating is carried out. At the conclusion of the initial precoating, the valves V2 and V7 are closed and valve V8 is opened to drain any medium from the interior of the tubes 15. Finally, valves V8 and V6 are closed, the pump 55 is stopped and the valves V1 and V2 are opened to initiate the actual filtration cycle as hereinbefore described.

From the foregoing detailed description of applicant's apparatus and his method of operation, it will be readily appreciated that the present invention provides a new and improved filter medium, filter apparatus and method of filtration. The utilization of aluminum oxide as a filtration medium has many advantages in view of the temperature stability, chemical inertness, structure integrity, and water insolubility of the material.

At the same time, the present invention provides apparatus and medium manipulation techniques effective to rejuvenate the heavy, abrasive, difficulty handled filter medium for reuse. The rejuvenation of the medium is important, not only for economy, but also to avoid the necessity of disposing of additional radioactive waste from atomic power plants or the like. Of course, the medium can be thrown away when clogged with contaminants or a simple reverse flow cleaning can be used.

Aluminum oxide or alumina also has one other outstanding characteristic. Due to the extreme surface areas which are present in the extremely finely divided filter medium, wet aluminum oxide acts almost like a solid and will not drain through an aperture such as that provided by the drain line 32 in the tank 10. However, if an excess of water is present in the form of a layer of water over the aluminum oxide, it has been found that the aluminum oxide will readily flow through even a restricted aperture. By maintaining a body of water over the filter medium inside the container 10, the filter medium can be readily drained through the restricted drain line 32 into the lower separation tank 40. Similarly, by retaining a liquid level over the medium as it is present in the lower section 43 of the tank 40, it is possible to drain the media through the line 44 of the valve V4 and the line 61 into the throat of the eductor 60.

In the drainage of the tank 10, complete drainage can be assured by simply actuating the pump 55 and opening the valve V6 during drainage or even after drainage to flush down the last reminants of the filter medium.

By utilizing the suspended tubes 15, 16 embedded within the filter medium, it is possible to provide a large amount of filtration area within the tank 10 of relatively small size. Since a typical power plant might use 20,000 gallons per minute of steam condensate and since the flow rate through aluminum oxide ranges from about 5 gallons per minute per square foot to about 10 gallons per minute per square foot, it is necessary to create filtration area cheaply and effectively. The concentric, multiple tube design of the present invention creates this area in a relatively small tank 10.

The density of aluminum oxide prevents its suspension in a slurry of liquid for effective movement by a pump or other pressure generating means. Thus, the natural flow characteristics of the material are utilized by gravitionally dumping the tank 10 into the separation tank 40 and by gravitationally flowing from the separation tank to the throat of the eductor 60. The transfer of the dense media back to the pressure vessel 10 is accomplished by creating a large flow of liquid, by means of the pump 55 at a high velocity and feeding the dense medium into this line through the eductor at a slower and more sluggish pace. By utilizing 4 to 5 times as much water flowing through the line 59 as there is media flowing into the line 59, it is possible to transport the dense media for deposition within the filter tank or at the bed location.

I claim

1. In a deep bed filter, a tank, inlet and outlet means for said tank, a body of granular, substantially pure alumina interposed between said inlet and said outlet means and serving as a filter medium in which dirt accretes, a dumping port at the lower extremity of said tank, a separating receptacle communicating with said port to receive the alumina and accreted dirt from said tank, agitating means in said receptacle for agitating liquid, alumina and dirt, means for decanting admixed liquid and dirt from the alumina, an alumina return line leading from a source of liquid under pressure to the tank and an eductor in said return line vented to said receptacle through which the alumina is withdrawn from said receptacle to mix with the liquid under pressure in said return line for flow back to said tank.

2. In a method of filtering dirt from liquid at elevated temperatures and/or pressures, the steps of flowing the liquid through a filter bed consisting essentially of finely divided granular alumina, accreting the dirt in the alumina, interrupting the flow of liquid, gravitationally transferring the filter bed to a separation location, thoroughly admixing liquid with the alumina and accreted dirt, decanting at least some of the liquid and the dirt admixed therewith, flowing a stream of liquid from a source of such liquid to the bed location and educting the alumina from the separation location into said stream, thereby transferring the alumina back to the bed location.

3. In a deep bed filter, a pressure tank, a plurality of vertically disposed and spaced perforate tubes depending into said tank and arranged in concentric inlet and outlet groups, means joining the inlet group of said tubes to a source of dirty liquid, means joining the upper ends of the outlet group of said tubes to an outlet for clean liquid, means joining the lower ends of said outlet tubes to a drain conduit, and a body of granular, finely divided alumina disposed in said tank and interposed between said tubes, the withdrawal of clean liquid from the upper ends of the outlet tubes preventing the flow of alumina particles from the tubes with the clean liquid, and the means joining the lower ends of said outlet tubes accommodating the drainage of liquid and any alumina from said outlet tubes.

4. In a method of filtering dirt from liquid at elevated temperatures and/or pressures, the steps of flowing the liquid through a filter bed consisting essentially of finely divided granular alumina to a plurality of outlet tubes embedded in said bed and precoated with alumina, accreting the dirt in the alumina, interrupting the flow of liquid, gravitationally transferring the filter bed and the precoated alumina to a separation location, thoroughly admixing liquid with the alumina and accreted dirt, decanting at least some of the liquid and the dirt admixed therewith, flowing a stream of liquid from a source of such liquid to the bed location, educting the alumina from the separation location into said stream, thereby transferring the alumina back to the bed location, and circulating liquid from said tank through said bed and out through said outlet tubes to precoat a portion of said bed onto said outlet tubes.

5. In a method of filtering ultra-fine particles from steam condensate in a turbine power plant, the condensate being a liquid at an elevated temperature in excess of 150° F., the steps of passing the condensate through a filtration medium in the form of a bed consisting essentially of granular, at least 99 percent pure alumina, the bed being at least partially precoated on a tubular support, the bed having a thickness measured in the direction of liquid flow, of at least 1 inch, and the average particle size of said alumina ranging from about 44 to about 149 microns.

6. In a method of filtering in a filter having spaced inlet and outlet openings for the flow therethrough of an aqueous suspension at a temperature in excess of 150° F., the step of passing the suspension from said inlet opening to said outlet opening through a filter media interposed between said openings and consisting essentially of granular, finely divided aluminum oxide of a purity on the order of 99 percent and having an average particle size ranging from about 44 microns to about 149 microns.

* * * * *